(12) United States Patent
Tokumitsu

(10) Patent No.: US 8,650,981 B2
(45) Date of Patent: Feb. 18, 2014

(54) ROBOT PROVIDED WITH MOVABLE BODY MOVED ALONG LINEAR MOVEMENT RAIL

(75) Inventor: Takamasa Tokumitsu, Handa (JP)

(73) Assignee: Denso Wave Incorporated, Tokyo (JP)

( * ) Notice: Subject to any disclaimer, the term of this patent is extended or adjusted under 35 U.S.C. 154(b) by 204 days.

(21) Appl. No.: 12/588,683

(22) Filed: Oct. 23, 2009

(65) Prior Publication Data

US 2010/0101360 A1    Apr. 29, 2010

(30) Foreign Application Priority Data

Oct. 24, 2008    (JP) .................................. 2008-274263

(51) Int. Cl.
*B25J 18/00*    (2006.01)

(52) U.S. Cl.
USPC ...................................... 74/490.01

(58) Field of Classification Search
USPC ............ 74/490.01, 490.06; 414/744.5, 744.7, 414/749.1
See application file for complete search history.

(56) References Cited

U.S. PATENT DOCUMENTS

| | | | | |
|---|---|---|---|---|
| 4,978,274 A | * | 12/1990 | de Groot | 414/744.3 |
| 5,111,709 A | * | 5/1992 | Torii et al. | 74/89.35 |
| 5,274,213 A | * | 12/1993 | Sartorio | 219/125.1 |
| 5,383,423 A | | 1/1995 | van der Lely | |
| 2005/0196263 A1 | * | 9/2005 | Tamura | 414/744.5 |
| 2008/0282821 A1 | | 11/2008 | Tokumitsu | |

FOREIGN PATENT DOCUMENTS

| | | |
|---|---|---|
| JP | 5-78487 | 10/1993 |
| JP | A-6-304217 | 11/1994 |
| JP | A-8-141949 | 6/1996 |
| JP | A-2009-160707 | 7/2009 |

OTHER PUBLICATIONS

Jun. 5, 2012 Office Action issued in Japanese Patent Application No. 2008-274263 (w/translation).

* cited by examiner

*Primary Examiner* — Vicky Johnson
(74) *Attorney, Agent, or Firm* — Oliff PLC

(57) ABSTRACT

A robot is provided in a Cartesian space. The robot is provided with a linear movement rail, a movable body, a swing arm, a linear movement arm. The linear movement rail extends in parallel with the X-axis direction. The movable body is linearly moved in the X-axis direction along the linear movement rail. The swing arm has a first end and a second end. The first end is rotatably connected to the movable body around an R-axis (which is a swing axis) extending in a horizontal direction which is orthogonal to the X-axis direction and the second end extends radially from the R-axis. The linear movement arm, which is connected to the second end of the swing arm, moves a wrist unit in the Y-axis direction which is in parallel with the R-axis. A task tool is loaded to the wrist unit.

5 Claims, 4 Drawing Sheets

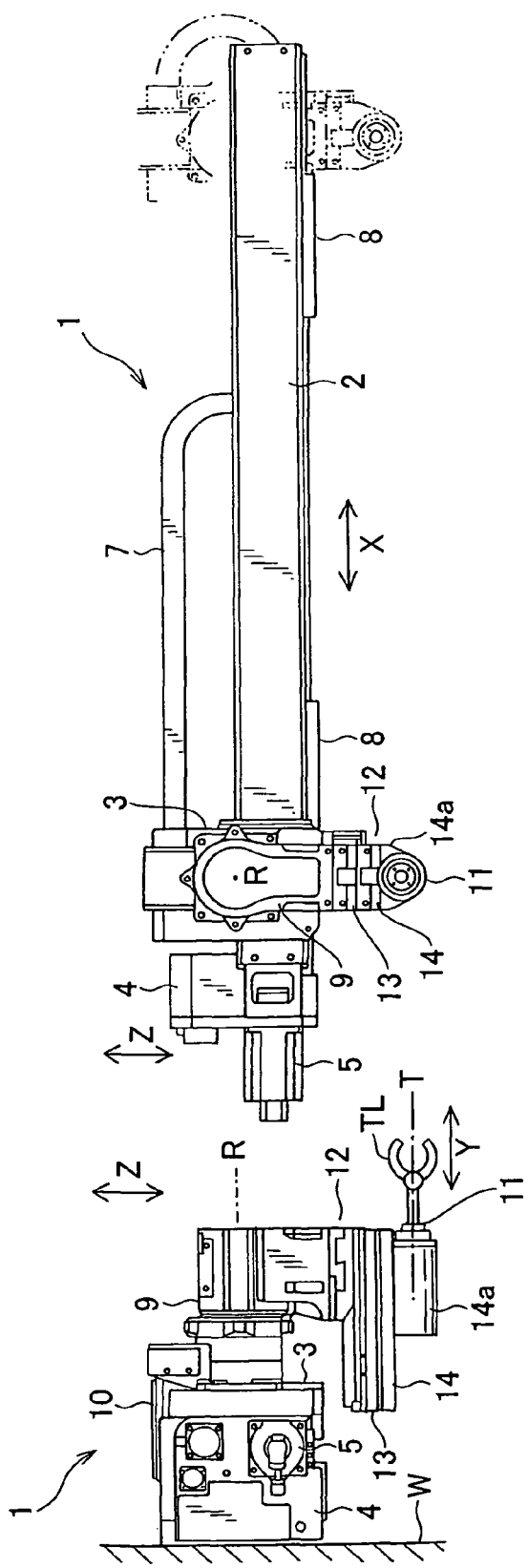

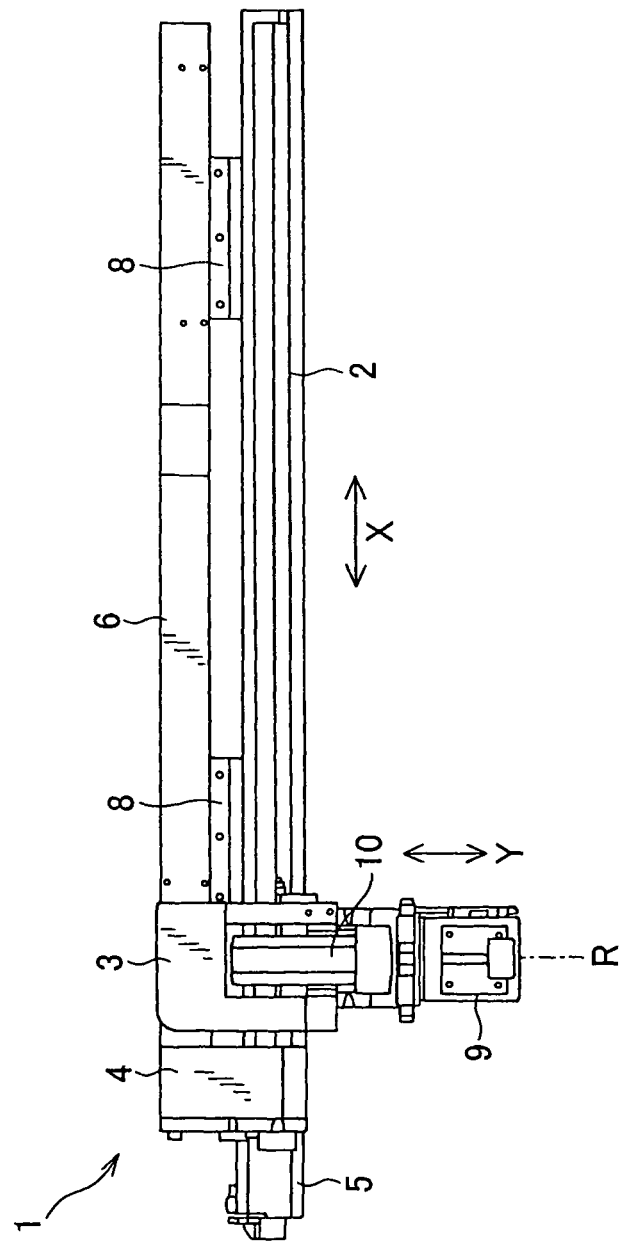

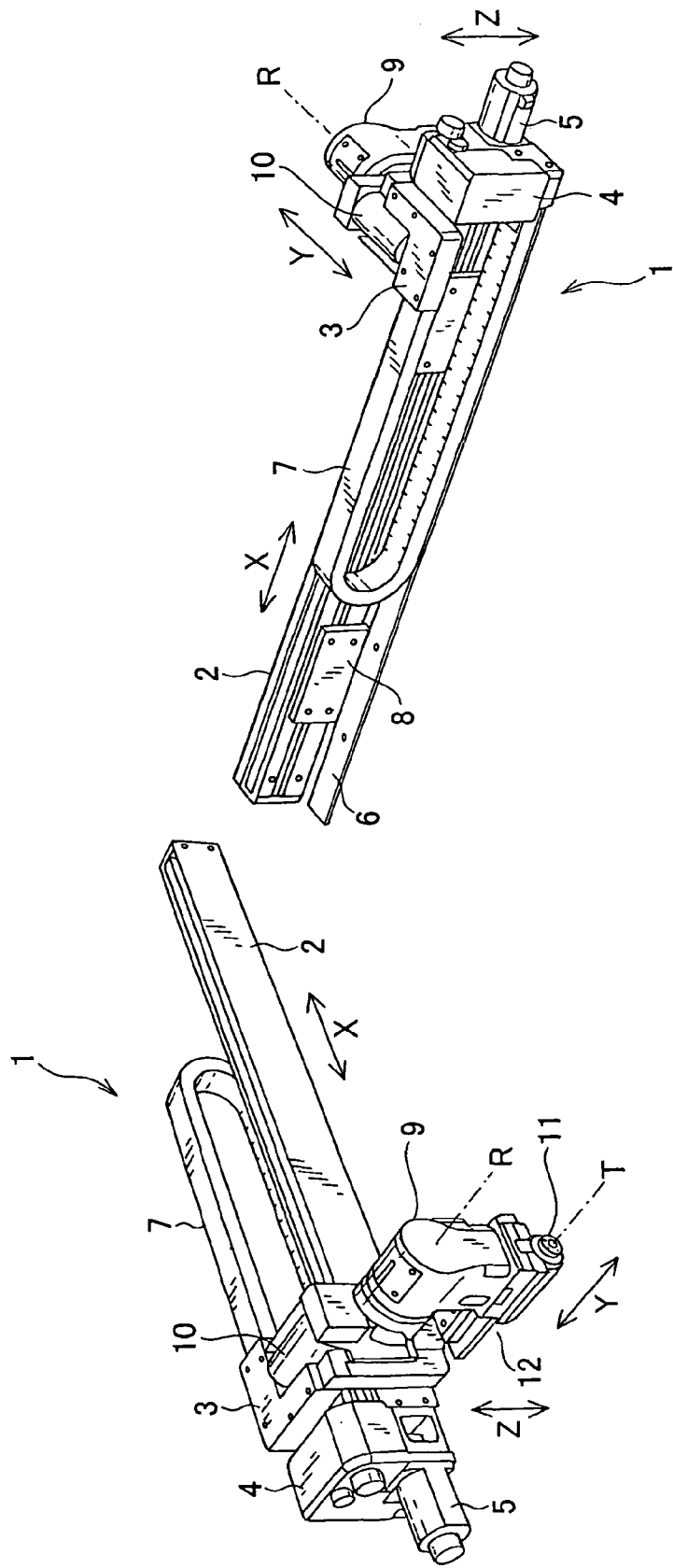

ROBOT PROVIDED WITH MOVABLE BODY MOVED ALONG LINEAR MOVEMENT RAIL

CROSS-REFERENCE TO RELATED APPLICATION

This application is based on and claims the benefit of priority from earlier Japanese Patent. Application No. 2008-274263 filed Oct. 24, 2008, the description of which is incorporated herein by reference.

BACKGROUND OF THE INVENTION

1. Technical Field of the Invention

The present invention relates to a robot having a movable body which is moved along a linear movement rail horizontally extending in the X-axis direction.

2. Related Art

Some types of robots have been known, which carry out tasks, such as an assembly, in an industrial plant in which an assembly line is provided as a task line. For example, as disclosed in Japanese Patent Application Laid-Open Publication No. 8-141949, Cartesian coordinate robots (X-Y robots) have been known as a type of such robots.

Such a Cartesian coordinate robot works in a space defined by an X-axis (a linearly movable axis), a Y-axis orthogonal to the X-axis, a Z-axis (a vertical axis) orthogonal to the X- and Y-axes, and a T-axis (a rotation axis) orthogonal to the X-axis. This robot includes an X-axis transfer unit disposed on the floor of a factory, a Y-axis transfer unit moved by the X-axis transfer unit in the X-axis direction, a Z-axis transfer unit moved by the Y-axis transfer unit in the Y-axis direction, and a wrist unit moved by the Z-axis transfer unit in the vertical direction (Z-axis direction) and rotatable about the X-axis (T-axis). A task tool, such as a chuck, is attached to the wrist unit in a replaceable manner. Thus, it is so configured that a task can be performed with the wrist unit (task tool), being freely moved in the three directions defined by the X, Y and Z axes.

While the robots as described above are involved in their tasks in a task line, there has been an increasing need, for example, of gaining a good view over the factory so that one can easily grasp the operating conditions of the task line. For this reason, it has been desired to reduce the volume of a task line (i.e., an assembly line or a production line) (hereinafter the volume of a task line is referred to as a "task line volume"), or more specifically, the vertical dimension of a task line.

Accordingly, those robots which are used in a task line are also desired to be reduced in their dimensions in the vertical direction (Z-axis direction) and the widthwise direction (Y-axis direction), excepting the X-axis direction which usually coincides with the transfer direction of work, i.e. the task line, along which such robots are arranged. Of the two dimensions, the dimension in the vertical direction has particularly been desired to be reduced, in order to ensure a good view over the factory.

However, such a generally used Cartesian coordinate robot, with all of the three axes X, Y and Z being linear movement axes, will have a problem in reducing the task line volume. For example, the Z-axis transfer unit needs to have a vertical dimension suitable for the required vertical movement range of the wrist unit. However, it is difficult to achieve good reduction in the vertical dimension of the Cartesian coordinate robot if the required vertical movement range of the wrist unit is to be maintained.

Also, achieving reduction in the task line volume would be useless if the reduction causes the takt time (movement speed of the robot) to be lengthened. With the achievement of the reduction in the task line volume, at least the takt time of the conventional level is required to be maintained. In addition, it is needed to avoid obstacles on the task line or suspended overhead without causing collision with the obstacles.

SUMMARY OF THE INVENTION

The present invention has been made in light of the circumstances described above, and has as its object to provide a robot having a movable body which is movable along a linear movement rail horizontally extending in the X-axis direction, able to reduce the vertical dimension of the robot while maintaining the required movement range and the required movement speed, and also able to avoid obstacles on the task line or suspended overhead without causing collision with the obstacles.

In order to achieve the above object, the present invention provides a robot driven in a space in which there are an orthogonal X-axis, Y-axis and Z-axis, that is, in a Cartesian space. The robot comprises a linear movement rail that extends which is parallel with the X-axis direction; a movable body linearly moved in the X-axis direction along the linear movement rail; a swing arm having a first end and a second end, wherein the first end is rotatably connected to the movable body around an R-axis (which is a swing axis) extending in a horizontal direction which is orthogonal to the X-axis direction and the second end extends radially from the R-axis; and a linear movement arm that is connected to the second end of the swing arm and moves a wrist unit in the Y-axis direction which is parallel with the R-axis, a task tool being loaded to the wrist unit.

With this configuration, the wrist unit at the end of the linear movement arm is moved in the X-axis direction with the X-axis linear movement of the movable body. Also, the wrist unit is moved along a rotation locus resulting from the rotation (swinging motion) of the swing arm about the R-axis which is orthogonal to the X-axis direction and extends in the horizontal direction, to thereby ensure the vertical movement range. Further, the wrist unit is moved in the Y-axis direction with the linear movement arm.

Thus, the vertical movement (Z-axis movement) range of the wrist unit falls within the range of the rotation (swinging motion) of the swing arm about the R-axis which extends in the horizontal direction. In this way, compared to the robot using a Z-axis transfer unit, the robot of the present invention can reduce the Z-axis dimension of the entire arms, but nevertheless can permit the wrist unit to have the same Z-axis movement range as that of the robot using the Z-axis transfer unit.

In contrast, in the present invention, the robots in a task line are involved not only in an assembly tasks performed in the same position, but also in pick-and-place tasks (i.e., picking up, carrying and placing a work at a specific position) involving the X-axis movement. Depending on the factory, there is not always enough space for a robot to carry a work to a destination, because boxes of supplementary parts may be placed on the task line, or because other facilities of the factory may intrude on the task line.

Under such conditions, the robot is required to raise its arm (i.e., required to move in the Z-axis direction) to avoid the obstacles and carry the work to the destination.

With a generally used Cartesian coordinate robot, however, raising the arm to a certain level in the Z-axis direction for the avoidance of an obstacle means permitting the Z-axis transfer unit to move upward, leading to possible collision with other obstacles that may be suspended from the ceiling, for example.

The X-axis movement of the wrist unit can be produced by combining the X-axis movement of the movable body along the linear movement rail with the X-axis movement components of the swinging motion of the swing arm. Therefore, the work can be carried to the destination faster than a generally used Cartesian coordinate robot. Accordingly, the movement speed can be ensured, which means that the takt time can be maintained or can be shortened.

Further, for example, the robot of the present invention can impart X-axis movement to the movable body, while avoiding obstacles, such as the facilities of the factory or other devices, or works, which would be partially present in the movement range of the robot.

Specifically, the robot of the present invention can avoid obstacles by raising or lowering the swing arm to permit the movable body to move in the X-axis direction. More specifically, for example, in a pick-and-place task performed using the X-axis movement along the linear movement rail, the robot of the present invention can avoid obstacles present above and below the linear movement rail by raising and lowering the wrist unit utilizing the rotation (swinging motion) of the swing arm about the R-axis, with the tip of the wrist unit being parallel to the X-axis direction.

Accordingly, the raising and lowering motions of the wrist unit, caused by the rotation of the swing arm about the R-axis, are constrained within the permitted Z-axis movement range, without allowing the arm to project outside the permitted Z-axis movement range. Thus, performing the pick-and-place tasks while avoiding obstacles can be easily ensured. In this way, the robot of the present invention can enhance the flexibility in the avoidance of obstacles.

It is preferred that the linear movement arm is a telescopically movable retractable arm of which movement is telescopically controlled and retractable.

With this configuration, the wrist unit can be moved in the Y-axis direction with the telescopic motion of the linear movement arm per se. Thus, the linear movement arm can be stretched when needed and can otherwise stay in a retracted state.

In this way, the linear movement arm with its reduced Y-axis dimension can ensure a wider movement range in the Y-axis direction.

BRIEF DESCRIPTION OF THE DRAWINGS

In the accompanying drawings:

FIG. 1A is a front view illustrating a robot according to an embodiment of the present invention;

FIG. 1B is a left-side view illustrating the robot according to the embodiment;

FIG. 1C is a top view illustrating the robot according to the embodiment;

FIG. 2A is a perspective front view illustrating the robot according to the embodiment;

FIG. 2B is a perspective rear view illustrating the robot according to the embodiment;

DETAILED DESCRIPTION OF THE PREFERRED EMBODIMENTS

Figure 3A:
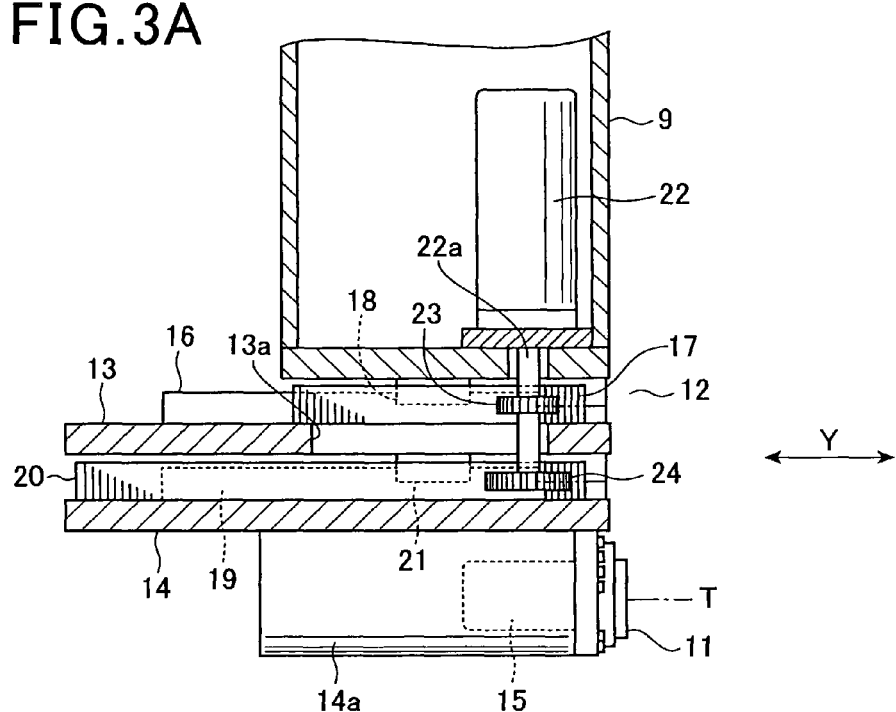
FIG. 3A is a vertical cross-sectional view illustrating the configuration of a linear movement arm of the robot, in a retracted state, according to the embodiment.

With reference to the accompanying drawings, hereinafter will be described an embodiment in which the present invention is applied to a wall-mounting (hanging) robot.

The general appearance of a robot 1 according to the embodiment will be grasped from the illustrations in FIGS. 1A to 2B. As shown in FIG. 1B, the robot 1 is adapted to be attached to a vertical wall surface W provided in a factory, for example, with an attachment surface (rear surface) of the robot 1 being applied thereto.

The following description will be given on an assumption that the attachment surface of the robot 1 is a rear surface, the horizontal direction is the X-axis direction, the widthwise direction is the Y-axis direction, and the vertical direction is the Z-axis direction.

As shown in FIGS. 1A to 2B, the robot 1 is provided with a linear movement rail 2 extending in the horizontal direction (X-axis direction) and a movable body 3. The movable body 3 is supported by the linear movement rail 2 so as to be slidably movable in the X-axis direction. The linear rail 2 is incorporated with a linear movement mechanism, such as a ball-screw mechanism, not shown, so that the movable body 3 can be linearly moved along the linear movement rail 2, or in the X-axis direction. The movable body 3 is configured to have a substantially L-shaped side face for arrangement across the front and the top faces of the linear movement rail 2.

The linear movement rail 2 is provided, at its left end portion, with a base 4 having a shape of a rectangular box. The base 4 incorporates therein an X-axis movement motor 5 serving as a drive source for the linear movement mechanism and includes a connector for establishing connection with an external unit (robot controller). As shown in FIG. 1B, the robot 1, when being attached to the wall surface W, is so adapted that the rear face of the base is applied to the wall surface W. In this case, it is ensured that a gap is provided between the wall surface W and the linear movement rail 2.

As shown in FIGS. 1C and 2B, a bottom plate 6 is attached to the linear movement rail 2 so as to be located in the gap and to extend rearward from the lower rear edge portion of the linear movement rail 2.

Electrical wiring (as well as air piping) connecting between the base 4 and the movable body 3 is bendably held by a flexible cable carrier (i.e., flexible flat cable called Cable Bear®) 7 and disposed on the bottom plate 6 (i.e. in the gap between the wall surface W and the linear movement rail 2).

As shown in FIG. 1A, mounting plates 8, 8 are provided at the left and right positions, of the bottom plate 6 so as to be projected downward from the bottom face thereof and be bolted to the outside. Instead of attaching to the wall surface W, the robot 1 can be attached onto a strut (support table), not shown, by mounting the mounting plates 8, 8 thereon.

The movable body 3 has a front face to which a swing arm 9 is connected. The swing arm 9 has a base portion (the upper portion as viewed in FIG. 1A or 1B) and a tip portion. The base portion is attached to the movable body 3 so that the swing arm 9 can be rotated (swung) about an R-axis which is orthogonal to the X-axis direction and extends in the horizontal direction (widthwise direction or the Y-axis direction). The tip portion extends in the radial direction from the R-axis. The R-axis is provided as a swing axis for the swing arm 9.

As shown in FIGS. 1B and 1C, the swing arm 9 is adapted to be freely actuated and rotated (swung) about the R-axis by an R-axis motor 10 provided at the upper part of the movable body 3.

It should be appreciated that, in FIGS. 1A to 3B, the swing arm 9 is illustrated with its tip portion being directed downward. In the following description, this state of the swing arm 9 is used as a reference to indicate directions which will be expressed by such terms as "upward", "downward", "upper", "lower", and the like.

Figure 3B:
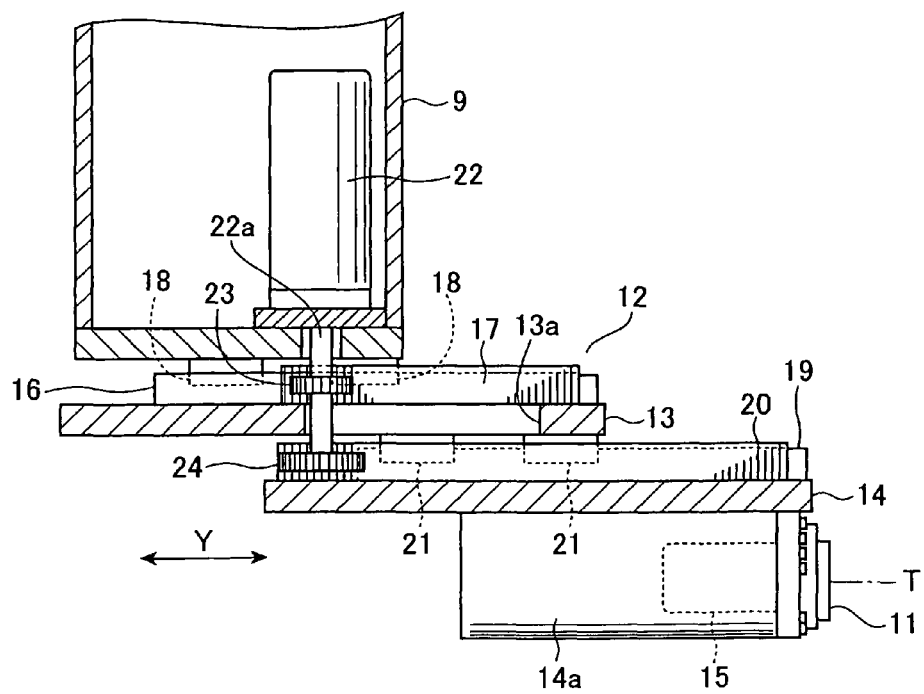
FIG. 3B is a vertical cross-sectional view illustrating the configuration of the linear movement arm of the robot, in a state of being extended, according to the embodiment.

As shown in FIGS. 3A and 3B as well, the tip portion of the swing arm 9 is attached with a linear movement arm 12 to which a wrist unit 11 is further attached. The linear movement arm 12 is adapted to linearly move the wrist unit 11 in the Y-axis direction which is parallel to the R-axis. A task tool TL (such as a hand) will be attached to the wrist unit 11. In the present embodiment, the linear movement arm 12 is made up of a so-called telescopically movable retractable arm. Referring to FIGS. 3A and 3B, hereinafter is described in detail the configuration of the linear movement arm 12.

The linear movement arm 12 includes a plate-like first movable member 13 and a plate-like second movable member 14. The first movable member 13 is provided with a long slot 13a extending in the Y-axis direction and disposed on the side of the tip portion of the swing arm 9 (on the side of the lower face of the tip portion as shown in FIG. 3A or 3B). The second movable member 14 is disposed on the side of the lower face of the first movable member 13. The movable member 14 has a lower face provided with a cylindrical member 14a. The wrist unit 11 is provided at the front end face of the cylindrical member 14a so as to be coaxially rotatable about a T-axis which is parallel to the Y-axis direction. In order to actuate and coaxially rotate the wrist unit 11, a T-axis motor 15 is provided in the cylindrical member 14a.

The first movable member 13 has a rear face (upper face) provided with a first sliding rail 16 extending in the Y-axis (widthwise) direction and a first rack 17 elongated in the Y-axis (widthwise) direction. Meanwhile, first linear guide blocks 18 are provided at an end face (lower face) of the tip portion of the swing arm 9. The first linear guide blocks 18 are adapted to support the first sliding rail 16 in a slidably movable manner, whereby the first movable member 13 is made movable in the Y-axis (widthwise) direction relative to the swing arm 9.

The second movable member 14 has a rear face (upper face) provided with a second sliding rail 19 extending in the Y-axis (widthwise) direction and a second rack 20 elongated in the Y-axis (widthwise) direction. Meanwhile, second linear guide blocks 21 are provided at a front face (lower face) of the first movable member 13. The second linear guide blocks 21 are adapted to support the second sliding rail 19 in a slidably movable manner, whereby the second movable member 14 is made movable in the Y-axis (widthwise) direction relative to the first movable member 13.

The swing arm 9 is provided therein with a Y-axis movement motor 22 having a rotary shaft 22a that passes through and projects downward from the lower outer wall of the swing arm 9. Further, the projected end of the rotary shaft 22a passes through the long slot 13a formed in the first movable member 13 and extends to the side of the rear face (upper face) of the second movable member 14. The rotary shaft 22a of the Y-axis movement motor 22 is provided with a first pinion 23 and a second pinion 24. The first pinion 23 is located at an intermediate portion of the rotary shaft 22a, for engagement with the first rack 17. The second pinion 24 is located at the projected end of the rotary shaft 22a, for engagement with the second rack 20. The second pinion 24 has a diameter twice as large as that of the first pinion 23.

With the configuration described above, when the rotary shaft 22a is rotated being actuated by the Y-axis movement motor 22, the first pinion 23 is actuated to move the first rack 17 as well as the first movable member 13 in the Y-axis direction. At the same time, the second pinion 24 is also actuated to move the second rack 20 as well as the second movable member 14 in the Y-axis direction. As a result, the linear movement arm 12 becomes linearly movable (telescopically movable) in the Y-axis (widthwise) direction.

Thus, the linear movement arm 12 is ensured to move forward (be stretched) with the normal rotation of the Y-axis movement motor 22 and to move rearward (be retracted) with the reverse rotation of the motor 22. In this case, the second movable member 14 moves a distance which is longer by a factor of two than the first movable member 13 because the diameter of the former is twice as large as that of the latter, as mentioned above.

Normally, the linear movement arm 12 is in a retracted state, as shown in FIG. 3A. FIG. 3B illustrates a state where the linear movement arm 12 has been maximally stretched forward.

Hereinafter, some advantages of the above configuration will be described. For example, as mentioned at the beginning, the robot 1 configured as described above carries out a task, such as an assembling task, a machining task, a welding task or a coating task, in a plant facility (task line, i.e., production line or assembly line). Therefore, the robot 1 is set up on the wall surface W or a strut, not shown, for example, so that the X-axis direction (the direction in which the linear movement rail 2 extends) coincides with the transfer direction of workpieces on the task line.

In this case, a required task tool TL is attached to the wrist unit 11 at the end of the linear movement arm 12 of the robot 1. Then, the robot controller, not shown, drives and controls the X-axis movement motor 5, the R-axis motor 10, the Y-axis movement motor 22 and the T-axis motor 15, as well as the task tool TL.

In the robot 1, the movable body 3 is freely moved in the X-axis direction along the linear movement rail 2, being actuated by the X-axis movement motor 5. At the same time, the swing arm 9 provided at the front face of the of the movable body 3 is actuated by the R-axis motor 10 and rotated (swung) about the R-axis which is orthogonal to the X-axis direction and extends in the horizontal direction. Further, the linear movement arm 12 provided at the tip portion of the swing arm 9 is actuated by the Y-axis movement motor 22 and freely moves (telescopically moves) in the Y-axis (widthwise) direction from the tip portion of the swing arm 9. At the same time, the wrist unit 11 provided at the end of the linear movement arm 12 (specifically, cylindrical member 14a) is actuated by the T-axis motor 15 and coaxially rotated about the T-axis. Thus, the robot 1 is adapted to carry out its task with free movement of the wrist unit 11 (task tool TL) in three dimensions (the X-, Y- and Z-axis directions).

In a task line where robots, such as the robot 1, are used, it is desired that the operating conditions of the task line be easily grasped by gaining a good view over the entire factory, for example. Accordingly, it has been desired to reduce the volume of a task line (task line volume), or in particular, to reduce the vertical dimension of the task line.

In this regard, the robot 1 according to the above embodiment enables movement in the vertical (Z-axis) direction, using the swing arm 9 which swings about the R-axis that extends in the horizontal direction. Therefore, compared to a generally used Cartesian coordinate robot, in which all of its three axes X, Y and Z are linear movement axes, the robot 1 can reduce the Z-axis dimension in its entirety, permitting the wrist unit 11 to have the same Z-axis movement range as that of the generally used Cartesian coordinate robot.

In the present embodiment, the X-axis movement of the wrist unit 11 can be produced by combining the X-axis movement of the movable body 3 along the linear movement rail 2 with the X-axis movement components in the swinging motion of the swing arm 9. Therefore, the work can be carried to the destination faster than a generally used Cartesian coordinate robot. Accordingly, the required speed can be ensured, which means that the takt time can be maintained or can be shortened.

Further, for example, the robot 1 is able to impart the X-axis movement to the movable body 3, while avoiding obstacles, such as the facilities of the factory or other devices, or works, which would be partially present in the movement range of the robot 1.

Specifically, the robot 1 can avoid the obstacles by raising or lowering the swing arm 9 to permit the movable body 3 to move in the X-axis direction. More specifically, for example, in a pick-and-place task performed with the X-axis movement along the linear movement rail 2, the robot 1 can avoid obstacles present above and below the linear movement rail 2 by raising and lowering the wrist unit 11 utilizing the rotation (swinging motion) of the swing arm 9 about the R-axis, with the tip of the wrist unit 11 being parallel to the X-axis direction.

Accordingly, the raising and lowering motions of the wrist unit 11, which are caused by the rotation of the swing arm 9 about the R-axis, are ensured to fall within the Z-axis movement range, without the need of sticking out the arms out of the Z-axis movement range. Thus, the conditions of performing the pick-and-place task, while avoiding obstacles can be easily ensured. In this way, the robot 1 can have enhanced flexibility in the avoidance of obstacles.

The robot 1 according to the embodiment uses a telescopically movable retractable arm as the linear movement arm 12. Therefore, the wrist unit 11 can be moved in the Y-axis direction with the telescopic motion of the linear movement arm 12 per se. Thus, the linear movement arm 12 can be extended only when needed and can otherwise stay in a retracted state.

In this way, the linear movement arm 12 with its reduced Y-axis dimension can ensure a wide movement range in the Y-axis direction. In particular, the linear movement arm 12 of the above embodiment has been configured including two movable members, i.e. the first and second movable members 13 and 14. Therefore, although the Y-axis dimension of the linear movement arm 12 has been significantly reduced, a comparatively large range of movement stroke can be obtained.

As described above, the robot 1 according to the above embodiment is provided with the movable body 3 which is movable along the linear movement rail 2 horizontally extending in the X-axis direction. Thus, the robot 1 can provide a good advantage of reducing the entire vertical (Z-axis) dimension, but at the same time, can ensure a required movement range and movement speed.

In the embodiment described above, a telescopically movable retractable arm has been used as the linear movement arm 12. Alternatively, however, a generally used linear movement mechanism may be used, such as a mechanism using ball screws and nuts, which enables linear movement.

The linear movement arm 12, when it is to be made up of a retractable arm, may not necessarily be provided with the two movable members 13 and 14, but may be provided with a single movable member or three or more movable members.

As a matter of course, the present invention may be implemented with adequate modifications within the scope not departing from the spirit of the present invention.

What is claimed is:

1. A robot provided in a space in which mutually-orthogonal three axes consisting of an X-axis, a Y-axis and a Z-axis are set, comprising:
   a linear movement rail fixedly arranged along the X-axis direction;
   a movable body mounted on the linear movement rail such that the movable body is linearly movable along the linear movement rail in the X-axis direction;
   a swing arm being arranged in a direction parallel with the Z-axis and having a first end and a second end, wherein the first end is rotatably connected to the movable body so that i) the first end is rotatable on an R-axis which is set to extend in a direction parallel to the Y-axis and ii) the swing arm is rotatable around the R-axis along an X-Z plane produced between the X- and Z-axes;
   a swinging driver arranged in the movable body and configured to rotate the first end of the swing arm on the R-axis:
   a linear movement arm that is linearly movably connected to the second end of the swing arm and that comprises a movable member which is movable between a predetermined range in a direction parallel with the Y axis;
   a linear movement driver arranged in the swing arm and configured to lineally drive the linear movement arm within the predetermined range in the direction parallel to the Y-axis;
   a wrist unit held by the linear movement arm such that the wrist unit is rotatable on a T-axis parallel with the Y-axis, a task tool being loaded to the wrist unit; and
   a rotating driver arranged in the linear movement arm and configured to rotate the wrist unit.

2. The robot of claim 1, wherein the predetermined range in the Y-direction starts from a first position at which the linear movement arm is most retracted and a second position at which the linear movement arm is most moved away from the swing arm first position.

3. The robot of claim 2, wherein the movable member comprises two plate members driven by the linear movement driver to be moved between the first position and the second position.

4. The robot of claim 3, wherein the linear movement arm is a telescopically movable retractable arm of which movement is telescopically controlled and retractable.

5. The robot of claim 3, wherein the swing arm, the linear movement arm, and the wrist unit are positionally aligned at the first position in the direction parallel to the Y-axis.

* * * * *